United States Patent [19]

Anger

[11] Patent Number: 4,755,042

[45] Date of Patent: Jul. 5, 1988

[54] TEMPLE END PIECE FOR A TEMPLE OF A SPECTACLE FRAME

[76] Inventor: Wilheim Anger, Chesa Pas-chüra, CH-7500 St. Moritz-Survretta, Switzerland

[21] Appl. No.: 6,801

[22] Filed: Jan. 27, 1987

[30] Foreign Application Priority Data

Feb. 12, 1986 [DE] Fed. Rep. of Germany ....... 3604357

[51] Int. Cl.$^4$ .......................... G02C 5/14; G02C 5/16
[52] U.S. Cl. ..................................... 351/123; 351/113
[58] Field of Search ............... 351/122, 123, 113, 117, 351/156, 157

[56] References Cited

U.S. PATENT DOCUMENTS

| 3,034,402 | 5/1962 | Alberetti | 351/113 |
| 4,652,098 | 3/1987 | Anger | 351/123 |
| 4,684,226 | 8/1987 | Anger | 351/123 |

Primary Examiner—Rodney B. Bovernick
Assistant Examiner—Jay Ryan

Attorney, Agent, or Firm—Roth & Goldman

[57] ABSTRACT

A temple end piece for a temple of a spectacle frame has a first segment extending in the extension of the temple shaft and situated below this a curved contact segment. The contact segment is supported at its lower end by means of a connecting segment extending to the rear of and downward from the first segment, whereby a low-resistance hinge is formed between the lower ends of the contact and connecting segments. At its lower end the contact segment is connected to the first segment via an elastic spring element, which opposes a rotation movement of the contact segment in the hinge with a certain elastic force. The first segment, the connecting segment and also the contact segment can be given rather sturdy dimensions with attention to the requisite rigidity of form of the temple end piece. Yet by virtue of the hinge provision is made for sufficient mobility of the contact segment. By virtue of the elastic spring element provision is made for slight elastic forces and thus for a pleasantly supple fit of the contact segment.

26 Claims, 2 Drawing Sheets

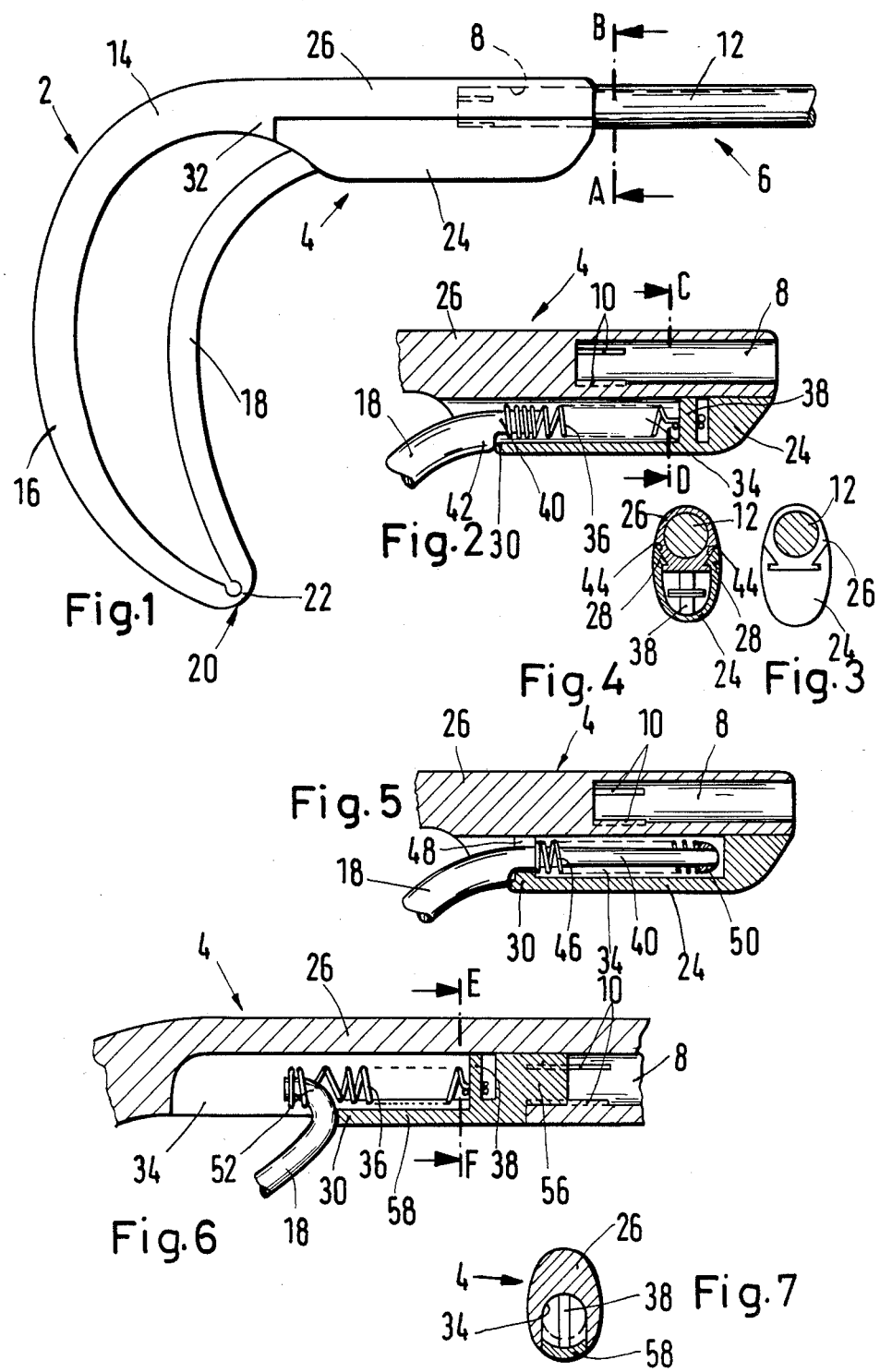

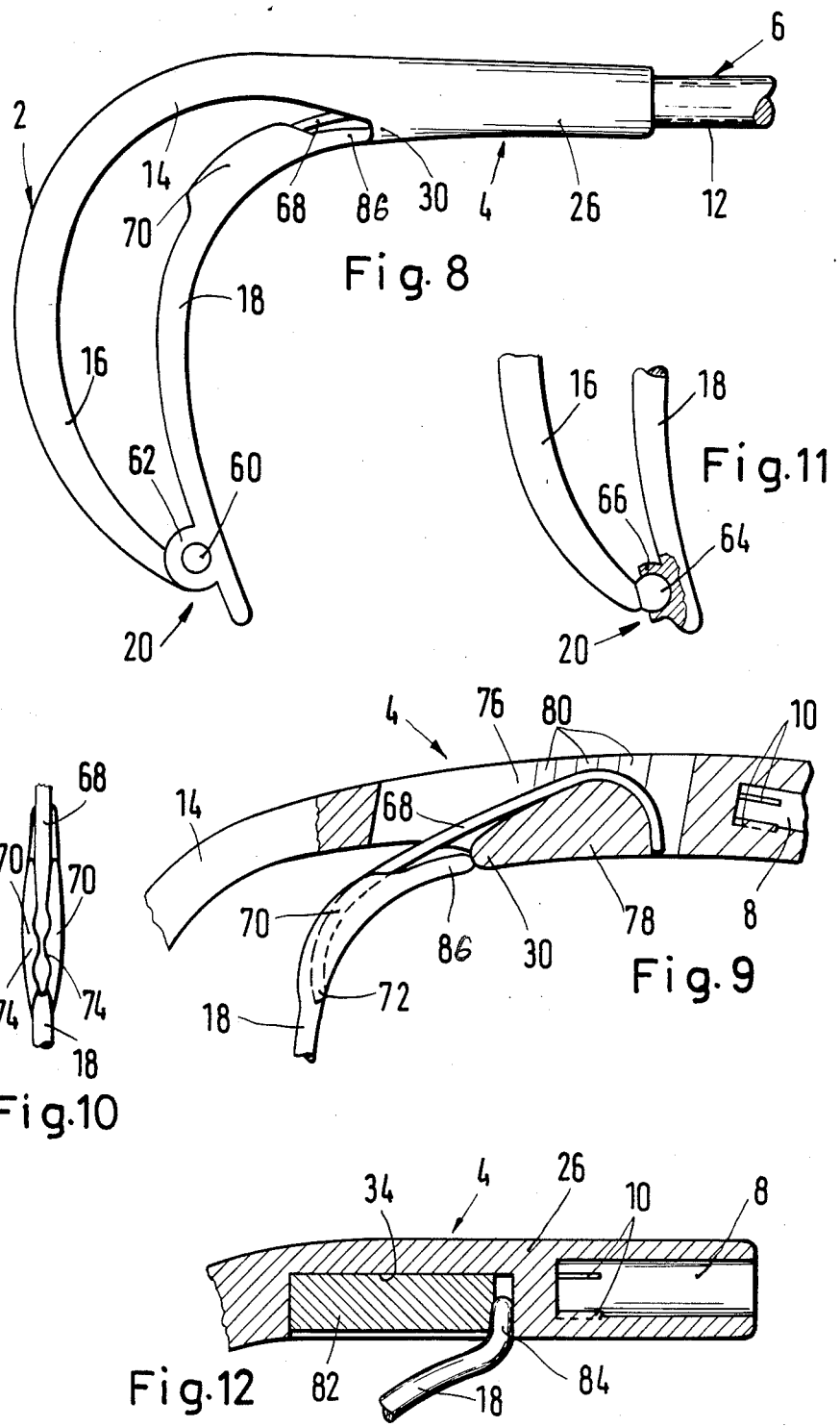

TEMPLE END PIECE FOR A TEMPLE OF A SPECTACLE FRAME

FIELD OF THE INVENTION

The present invention relates to a temple end piece for a temple of a spectacle frame.

PRIOR ART

U.S. Pat. No. 460,576 discloses a temple end piece in which a longitudinally extending first (temple) segment is connected to a contact segment which goes behind the ear, by a connecting segment. The lower ends of the connecting segment and of the contact segment are connected with one another by means of soldering or by means of a sharply curved wire segment that extends on the one hand into the contact segment and on the other hand into the connecting segment. The upper end of the contact segment is coupled with the first segment by an eyelet at the upper end of the contact segment, through which the first segment extends. The spring-like deflectability of the contact segment is afforded by the fact that the contact segment itself is designed as an elastic wire spring that yields under pressure and bends backward, i.e. in the direction of the connecting segment. The spring-like resilience of the contact segment is intended in the temple end piece known in the art to ensure that the contact segment fits well in its designated contact area on the ear and/or the skull of the spectacle wearer, so that a more comfortable fit is achieved. Disadvantageous in the temple end piece known in the art is the fact that whenever, in order to achieve sufficient rigidity of form in the temple end, larger cross sections are selected for the contact segment and the connecting segment as well, the elastic quality is diminished. If, on the other hand, small cross sections are chosen for purposes of achieving a sufficiently great spring-like elasticity, the stability of form of the temple end piece suffers. In addition, small cross sections of the contact segment can cause it to cut into the designated contact area and be a source of discomfort.

My prior U.S. Pat. No. 4,652,098 dated Mar. 24, 1987 discloses a temple end piece which has some of the features of the temple end piece disclosed herein with the exception of the coupling of the upper end of the contact with the first segment. My prior invention improves the deflecting pattern of the contact segment under pressure and comfort in wearing by designing the connection between the connecting segment and the contact segment to function elastically like a spring, so that the contact segment can be rotated around this connection as a whole against an elastic resistance exercised by this connection. Since this connection serves both to support the contact segment as well as to afford its deflectability and to give the contact segment its elastic restoring force in the event it is deflected, it must be designed with all three of these functions in mind.

OBJECT OF THE INVENTION

The present invention is based on the objective of designing the temple end piece of this genre in such a manner that while ensuring adequate stability of form for the elements of the temple end piece provision will be made simultaneously for the elastic deflectability of the contact segment even through relatively minimal forces.

SUMMARY AND ADVANTAGES OF THE INVENTION

In the temple end piece in accordance with the present invention the connection between the contact segment and the connecting segment is designed as a low-resistance hinge which solely has the function of supporting the contact segment near its lower end and assuring the mobility of that segment. The elastic spring element exerting its effect between the upper end of the contact segment and the first segment affords the elastic resistivity intended to counteract the deflection movement of the contact segment. The contact segment itself need neither be deformable as such nor have elastic spring properties since movement is guaranteed by the hinge and spring tension is furnished by the elastic spring element. In any event, the possibility should not be excluded that the contact segment might also posses a certain degree of deformability and elasticity. In addition, it is important for the present invention that the functions of "deflectability of the contact segment" and "generation of an elastic restoring force" need not be fulfilled by one and the same structural component of the temple end piece, but are detached from one another, so that both the hinge and the elastic spring element can each be so designed as to take into account the function to be fulfilled by that part.

Additional embodiments of the present invention may be found in the subsidiary claims, as well as in the following description of the embodiments with reference to the following drawings:

FIG. 1: side view of a preferred embodiment of a temple end piece;

FIG. 2: sectional drawing in enlargment of a cutaway portion of the temple end piece according to FIG. 1;

FIG. 3: sectional representation along A–B as in FIG. 1;

FIG. 4: sectional representation along C–D as in FIG. 2;

FIG. 5: sectional representation similar to FIG. 2 of a second embodiment;

FIG. 6: sectional representation similar to FIG. 2 of a third embodiment;

FIG. 7: sectional representation along E–F as in FIG. 6;

FIG. 8: view similar to that in FIG. 1 of a temple end piece according to a fourth embodiment;

FIG. 9: view in enlargement, partially in section, of an area of the temple end piece as in FIG. 8;

FIG. 10: view in section along X in FIG. 9;

FIG. 11: representation in section of a fifth embodiment of the temple end piece;

FIG. 12: section similar to that in FIG. 2 through a model in accordance with a sixth embodiment.

FIG. 1 shows a side view of a temple end piece 2 in accordance with a preferred embodiment. This temple end piece manifests a longitudinal, essentially straight first segment 4, which at its front end at the right (as seen in FIG. 1) is connected to a temple shaft 6 only partially illustrated of a temple of a spectacle frame. In the first segment 4 of the temple end piece 2 a cylindrical borehole 8 has been formed, near the end of which ridges 10 have been shaped extending in the direction of the borehole axis and protruding radially inward. The temple of the temple shaft 6 is shaped in the form of a cylindrical plug 12 with circumferential grooving. The plug 12 is inserted into the borehole 8 when the temple is assembled and the ridges 10 will then be pressed into the surface of the plug 12 and its grooving.

Although in the embodiment under discussion here the temple end piece 2 and the temple shaft 6 are first produced as separate items and then connected to one another by means of the plug connection as described, the present invention is not limited to such an application. The temple end piece can also be formed in one piece with the temple shaft or connected with the latter in a different manner than that described in the above.

At its back end at the left (as seen in FIG. 1) the first segment 4 transforms via a transitional area 14 into a connecting segment 16 that extends essentially downward with respect to the first segment 4. The connecting segment 16 tapers down from above to below somewhat and is curved in the shape of an arc, with the inner side of the curvature facing forward, i.e. to the right (as seen in FIG. 1). The first segment 4, the transitional area 14 also curved in the shape of an arc and the connecting segment 16 are formed in one piece, preferably made of a suitable plastic, for example, of a polyetherimide.

In front of the connecting segment 16, i.e. to the right of it (as seen in FIG. 1) a contact segment 18 is situated, which is connected at its lower end to the lower end of the connecting segment 16 and which at its upper end is coupled to the first segment 4 in a manner which will be described later in detail. The contact segment 18 is curved essentially in the form of a crescent, with the inner side of the curvature facing the front, i.e. to the right (as seen in FIG. 1). The contact segment serves the purpose of coming into contact with the ear and/or head of the spectacle wearer and there to support the spectacle frame, with this having the most comfortable result for the spectacle wearer, i.e. with the avoidance of pressure points. The contact segment 18 has a circular or oval profile and is thick enough in shape that on the one hand it will have sufficient rigidity of form, i.e. will not bend out of shape to any great degree, and on the other that it will be in contact with the ear and/or skull over as large a surface as possible in order to prevent any cutting of the contact segment into the skin. However, the possibility is not excluded on account of a certain rigidity of form that the contact segment will deform to a certain degree under the stresses occurring with normal use of the spectacles and fit snugly against the contact area on the ear and/or skull.

In the preferred embodiment depicted in FIGS. 1 through 4 the connection between the lower ends of the contact segment 18 and the connecting segment 16 consists of a low-resistance hinge 20 in the form of a thin, strip-shaped plastic segment 22. This plastic segment 22 and the connecting segment 16, as well as the contact segment 18, are formed in the embodiment shown in one piece. The greatest width of the plastic segment 22 runs vertically to the drawing plane of FIG. 1. In this manner the hinge 20 manifests a certain transverse rigidity vertical to the drawing plane of FIG. 1; however, in the drawing plane of FIG. 1 it is extremely pliable and low in resistance, so that the contact segment 18 can be moved in the hinge 20, without depending on any deformation of the contact segment 18 itself whatever in this moving and deflection motion. The hinge 20 supports the contact segment 18 and guarantees its mobility; however, essentially no power of resistance is exercised by the hinge 20 on the contact segment 18 against its being deflected.

As may be seen in FIG. 1 through 4, a longitudinal cap 24 is part of the first segment 4, and this cap 24 is situated below on the body 26 of the first segment 4. As may be seen in FIG. 4, the cap 24 has an essentially U-shaped profile and is open at the top. In addition, the cap 24 is open back end, at the left (as seen in FIG. 2), as FIG. 3 also shows. At the upper edges of the cap 24 on each side a protrusion 28 pointing inward has been formed, which grips in an analagously shaped groove on the body 26. The bottom of the cap 24 at its back end forms a stop 30. An additional stop 32 has been formed in turn on the body 26, against which the cap 24 reposes and which prevents the cap 24 from shifting to the left (as seen in FIG. 1).

The body 26 and the cap 24 jointly form the borders of a chamber or cavity 34, extending in the longitudinal direction of the first segment 4 and beneath the borehole 8. In this cavity 34 is an elastic spring element in the form of a spiral tension spring 36 suspended at its front end on a stud 38 formed in one piece with the cap 24. At its back end the spiral tension spring 36 is firmly attached to the upper end of the contact segment 18, specifically in such a manner that it is clamped on a short mandrel 40 formed on the upper end of the contact segment. Below the mandrel 40 the contact segment 18 has a shoulder 42, which comes to rest on the stop 30.

The temple end piece in accordance with the above described preferred embodiment is assembled in such a manner that the spiral tension spring 36 is first mounted on the mandrel 40, that following this the front end of the spiral tension spring is hung on the stud 38 and that finally the cap 24 is snapped onto the body 26 of the first segment 4, for which purpose the cap 24 above its two protrusions 28 exhibits a wedge surface 44 diverging from inside to out.

FIGS. 1 and 2 shows the temple end piece with its contact segment 18 in the uncharged state. In this condition the contact segment 18 is pushed forward by the spiral tension spring 36 with slight force, so that the shoulder 42 rests on the stop 30. With the spectacles worn in place the contact segment 18 can be moved or shifted in a counter-clockwise direction in the hinge 20. This movement occurs against the pull exercised by the spiral tension spring 36, and this pull works to restore the contact segment 18 to its original position. The initial stress and spring constant of the spiral tension spring 36 can be determined solely from the standpoint that the reactive force exercised by the contact segment 18 on the car and/or head will be of sufficient magnitude.

In the following the additional embodiments will be described. Those parts and elements analogous to the parts and elements of the preferred embodiment as seen in FIG. 1 through 4 will be indicated by the same reference numerals. Those parts and elements already explained will not be described anew. The above explanations will apply to them where needed by analogy. Only the differences or particularities of the additional embodiments will be dealt with in the following.

In the second embodiment as shown in FIG. 5 the elastic spring element is formed in the shape of a compression spring 46, which is based at the back end of the cap 24 on a protrusion 48 facing upward from the bottom of the cap. The mandrel 40 at the upper end of the contact segment 18 is extended to the front or right end of the compression spring 46 and has small enough a diameter that it does not impede the movement of the compression spring. At its front or right (as seen in FIG.

5) end a ring 50 has been clamped on the mandrel 50 and this serves as a spring seat.

In the third embodiment as seen in FIGS. 6 and 7 the cavity 34 in the body 26 is formed directly in the extension of the borehole 8. The cavity 34 is open downward. The spiral tension spring 36 is located in the cavity 34, and in the back or left (as seen in FIG. 6) end a hook 52 is inserted which is formed on the upper end of the contact segment 18. This hook can come to rest on the stop 30, as shown in FIG. 6. The front or right (as seen in FIG. 6) end of the spiral tension spring 36 is suspended on the stud 38, which in the third embodiment is formed in one piece on an insert 54 having a plug 56 fitting into the borehole 8 and a bottom 58 that closes off the cavity 34 in the area of the spiral tension spring from below.

The third embodiment has the advantage over the preferred embodiment and the second embodiment that the structural height of the first segment is narrowed down, because the cavity and the borehole are aligned with one another and do not range one next to the other.

In the fourth embodiment as seen in FIG. 8 through 10 the hinge 20 is equipped with a hinge pin 60 secured on the connecting segment 16. Formed in one piece with the contact segment 18 is a shackle toggle joint 62 which is engaged with the hinge pin 60. The axis of the hinge pin 60 extends vertically to the drawing plane of FIG. 8 and hence essentially vertical to the plane defined by the first segment 4, the connecting segment 16 and the contact segment 18. The hinge 20 as seen in FIG. 8 offers practically no resistance to a rotating motion around the axis of the hinge pin 60, but permits of no other movements.

A further possibility of a variant of the hinge 20 is shown in FIG. 11 in section for a fifth embodiment. In this form the hinge 20 has a ball 64 formed in one piece with the connecting segment 16 and snapped into a ball socket 66 formed in the contact segment 18. The hinge 20 as seen in FIG. 11 makes deflection movements of the contact segment 18 possible, even in directions vertical to the drawing plane of FIG. 11.

It will be understood that both the design of the hinge 20 as seen in FIG. 8 and the design as seen in FIG. 11 can be employed in conjunction with any of the elastic spring elements under discussion here.

In the fourth embodiment as seen in FIG. 8 through 10 the elastic spring element is designed as a rubber elastic filament 68 which is attached at one end to the upper end of the contact segment 18 and at the other end to the first segment 4. For this purpose the upper end of the contact segment has two clamp jaws 70 on its back, these forming a groove between themselves into which the filament 68 is clamped. Extending outward from the bottom of the groove to the front side of the contact segment 18 is a hole 70, through which the filament 68 is inserted. The surfaces of the clamp jaws 70 facing one another are provided with undulating ridges 74 to improve the firm hold on the filament 68.

Behind the borehole 8 in the first segment 4 an opening 76 is formed from the top downward through the first segment 4. In the opening 76 is located a bridge 78 connecting the two opposite walls of the opening with a convexly curved upper side, along which the elastic rubber filament is extended. Above the bridge 78 the two opposing walls of the opening 78 have undulating ridges 80 formed similarly to the ridges 74 and and holding the filament 68 clamping it securely between them.

The upper end of the contact segment 18 ends in the form of a nose 86, which reposes on the stop when the temple end piece is in the uncharged state. Out of this uncharged state, which is depicted in FIGS. 8 and 9, the contact segment 18 can be rotated in a counter-clockwise direction, during which process the elastic rubber filament 68 is stretched and supplies a corresponding elastic restoring force.

In the sixth embodiment as shown in FIG. 12 the elastic spring element is designed in the form of an elongated foam material body 82. This fits in an elongated cavity 34 open downward and located in the first segment 4 behind the borehole 8. On the upper end of the contact segment 18 an adjoint piece 84 extending essentially upward is formed, which juts into the cavity 34 and rests against the front or right (as seen in FIG. 12) end of the foam material body 82. With a rotation movement of the contact segment 18 in a counter-clockwise direction the foam material body 82 is compressed, thus exercising an elastic restoring force on the adjoint piece 84.

Although not depicted in the drawings, the contact segment 18 in particular, but also the connecting segment 16, the first segment 4 and the temple shaft 6 can also be curved vertically to the drawing planes of FIGS. 1 and 8, so as to have contours better suited to fit the shape of the head.

In the above the present invention is described with reference to the embodiments. It should be understood, however, that the present invention is not limited to the details of the embodiments described.

A temple end piece for a temple of a spectacle frame has a first segment extending in the extension of the temple shaft and situated below this a curved contact segment. The contact segment is supported at its lower end by means of a connecting segment extending to the rear of and downward from the first segment, whereby a low-resistance hinge is formed between the lower ends of the contact and connecting segments. At its lower end the contact segment is connected to the first segment via an elastic spring element, which opposes a rotation movement of the contact segment in the hinge with a certain elastic force. The first segment, the connecting segment and also the contact segment can be given rather sturdy dimensions with attention to the requisite rigidity of form of the temple end piece. Yet by virtue of the hinge provision is made for sufficient mobility of the contact segment. By virtue of the elastic spring element provision can be made for slight elastic forces and thus for a pleasantly supple fit of the contact segment.

I claim:

1. A temple end piece for a temple of a spectacle frame comprising: an essentially straight first segment extending in the longitudinal direction of the temple; an elongated arcuate contact segment extending essentially downwardly with respect to the first segment and intended to rest against the head and/or behind the ear; and a connecting segment extending from the rearward end of the first segment to the contact segment and connected to the contact segment at or below the vertical midpoint of the contact segment; a low-resistance hinge interconnecting the connecting segment and the contact segment; and an elastic spring element engaging the upper end of the contact segment and the first segment and biasing said upper end forwardly with respect to said first segment.

2. The temple end piece of claim 1, wherein said connecting segment is arcuate.

3. The temple end piece of claim 2, wherein the inner side of the arcuate curvature faces forward toward the ear.

4. The temple end piece according of claim 3, wherein the connecting segment is tapered from its upper end to said hinge.

5. The temple end piece of claim 4, wherein the first segment and the connecting segment are integrally formed in one piece.

6. The temple end piece of claim 5, further comprising an arcuate transitional area connecting the first segment to the connecting segment.

7. The temple end piece of claim 3, wherein the first segment and the connecting segment together form a rigid unit.

8. The temple end piece of claim 7, wherein the elongated contact segment has a circular or oval cross section.

9. The temple end piece of claim 3, wherein the elongated contact segment is also curved transversely to the arcuate curvature.

10. The temple end piece of claim 3, wherein the contact segment is rigid.

11. The temple end piece of claim 3, wherein the connecting segment and the contact segment are made in one piece of plastic in the region of the hinge and that the hinge is a thin strip of plastic.

12. The temple end piece of claim 11, wherein the largest cross-sectional dimension of the hinge extends substantially normal to the plane defined by the first segment, the connecting segment and the contact segment.

13. The temple end piece of claim 3, wherein the connecting segment and the contact segment are separate components.

14. The temple end piece of claim 13, wherein the hinge comprises two interlocking eyelets.

15. The temple end piece of claim 13, wherein the hinge interconnecting the contact segment and the connecting segment comprises a pin and a hinge eye engaged with the hinge pin.

16. The temple end piece of claim 15, wherein the axis of the hinge pin extends substantially normal to the plane defined by the first segment, the connecting segment and the contact segment.

17. The temple end piece of claim 13, wherein the hinge is a ball-and-socket hinge comprising a ball and a ball socket.

18. The temple end piece of claim 3, further comprising a stop on the first segment which limits forward movement of the upper end of the contact segment.

19. The temple end piece of claim 3, further comprising a longitudinally extending cavity in the first segment, said elastic spring element being disposed in said cavity.

20. The temple end piece of claim 19, further comprising a cap partially defining said cavity and closing one end thereof, said cap being fastened to said first segment.

21. The temple end piece of claim 19, wherein said cavity is substantially aligned with a longitudinally extending borehole formed in the first segment, said borehole serving to receive one end of a temple shaft.

22. The temple end piece of claim 19, wherein said elastic spring element is a compression spring.

23. The temple end piece of claim 19, wherein said elastic spring element is a spiral tension spring.

24. The temple end piece of claim 19, wherein said elastic spring element is a foam material body.

25. The temple end piece of claim 3, wherein said elastic spring element is an elastic rubber filament, which is connected at its one end to the contact segment and at its other end to the first segment.

26. The temple end piece according claim 3, wherein the first segment, the contact segment and the connecting segment are made substantially of plastic.

* * * * *